United States Patent
Masthoff (10) Patent No.: US 6,216,133 B1
(45) Date of Patent: *Apr. 10, 2001

(54) METHOD FOR ENABLING A USER TO FETCH A SPECIFIC INFORMATION ITEM FROM A SET OF INFORMATION ITEMS, AND A SYSTEM FOR CARRYING OUT SUCH A METHOD

(75) Inventor: Judith F. M. Masthoff, Eindhoven (NL)

(73) Assignee: U.S. Phi,ips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/655,169

(22) Filed: May 30, 1996

(30) Foreign Application Priority Data

Jun. 9, 1995 (EP) .................................................. 95201526

(51) Int. Cl.[7] ...................................................... G06F 17/30
(52) U.S. Cl. ............................................... 707/104; 707/6
(58) Field of Search ................................ 707/4, 104, 10, 707/6; 345/355, 327; 395/200.48

(56) References Cited

U.S. PATENT DOCUMENTS

| | | | |
|---|---|---|---|
| 5,223,924 | * 6/1993 | Strubbe | 358/86 |
| 5,408,655 | * 4/1995 | Oren et al. | 707/501 |
| 5,524,195 | * 6/1996 | Clanton, III et al. | 395/155 |
| 5,528,735 | * 6/1996 | Strasnick et al. | 345/427 |
| 5,555,354 | * 9/1996 | Strasnick et al. | 345/427 |
| 5,579,468 | * 11/1996 | Miyauchi et al. | 395/326 |
| 5,671,381 | * 9/1997 | Strasnick et al. | 345/355 |
| 5,689,669 | * 11/1997 | Lynch et al. | 345/355 |
| 5,696,965 | * 12/1997 | Dedrick | 707/10 |
| 5,835,087 | * 11/1998 | Herz et al. | 347/327 |
| 5,861,885 | * 1/1999 | Strasnick et al. | 345/355 |
| 5,901,246 | * 5/1999 | Hoffberg et al. | 382/209 |
| 5,901,287 | 5/1999 | Bull et al. | 395/200.48 |
| 5,920,848 | * 7/1999 | Schutzer et al. | 705/42 |
| 5,995,943 | * 11/1999 | Bull et al. | 705/14 |
| 6,016,499 | * 1/2000 | Ferguson | 707/104 |
| 6,085,086 | * 7/2000 | La Porta et al. | 455/432 |

OTHER PUBLICATIONS

Kwan et al., "An Intelligent Agent for Multimedia Nespaper", IEEE, p. 594–597, Sep. 30, 1995.*

"Issues in Multimedia Interface Design: Media Integration and Interface Agents", by B. Laurel et al, CHI '90 Proceedings, Apr. 1990, pp. 133–139.

* cited by examiner

*Primary Examiner*—Paul R. Lintz
*Assistant Examiner*—Charles L. Rones
(74) *Attorney, Agent, or Firm*—Gregory L. Thorne (57) ABSTRACT

A user of a system comprising a large set of information items, for example a multimedia database, is assisted by an agent in searching the set. The agent has a given affinity for the information items and selects a specific information item from the set in conformity with said affinity. On the basis of the interactions between the user and the system an image is formed of the affinity of the user for the information items. The agent utilizes this image, in addition to its own affinity, for the selection of a specific information item. A major application of the invention concerns a system in which the information items are presented as objects in a space and in which the agent guides the user through the space and proposes a specific object to the user.

21 Claims, 3 Drawing Sheets

METHOD FOR ENABLING A USER TO FETCH A SPECIFIC INFORMATION ITEM FROM A SET OF INFORMATION ITEMS, AND A SYSTEM FOR CARRYING OUT SUCH A METHOD

The invention relates to a method enabling a user to fetch a specific information item from a set of information items in an information processing system, in which each information item has one or more item attributes, the system comprising a first agent for evaluating the item attributes associated with the information items, thus forming an agent affinity between the first agent and each of the information items evaluated, said method comprising a selection step for the selection of the specific information item by the first agent in dependence on said agent affinity.

The invention also relates to an information processing system, comprising:
 a set of information items, each of which comprises one or more item attributes,
 a first agent having an instantaneous state for evaluating the item attributes associated with the information items and determining an agent affinity between the first agent and the information items, and for selecting a specific information item from the set for a user of the system in dependence on the agent affinity.

A method of this kind is known from the article "Issues in multimedia interface design: media integration and interface agents", B. Laurel et al., Proceedings of the fifteenth annual ACM conference, Apr. 1–5, 1990, Seattle, Wash., U.S.A. The known method utilizes a system with a number of agents, referred to as guides, for the selection of information items. Each agent has a given affinity for each information item and offers the user an ordered sub-set of items wherefrom the user selects a specific item. The known method utilizes a temporal metaphor, the information items being arranged in a temporal sequence relative to one another. In the known method the agents and the attributes of the information items are static. An agent therein operates on the basis of its own static sub-set and the static attributes of the information items.

It is an object of the invention to provide a method of the kind set forth in which the selection of the specific item by the agent is adapted to the instantaneous needs and circumstances of the user. To this end, the method in accordance with the invention is characterized in that it comprises the step of forming at least once an image of a user affinity between the user and the information items from a pattern of past interactions between the user and the system and recording this image in a user attribute, and that the selection step comprises the selection of the specific information item by the first agent in further dependence on the user attribute. As a result of the formation of an image of the user affinity between the user and the information items and the consideration of this user affinity for the selection of an information item, the item which best suits the user at the relevant instant will be selected from a possibly large group of information items. The method in accordance with the invention can be used notably to assist the user in searching large sets of information items such as they occur, for example in multimedia databases.

A version of the method of the invention in which the system comprises a set of agents and in which the method includes an activation step for activating the first agent from the set of agents is characterized in that the activation step comprises the activation of the first agent in dependence on the user attribute. In a system in which several agents are available, the user is supported by the system in selecting an agent. An agent is selected on the basis of the user attribute for the user, so that an agent which suits the user as well as possible is activated. A system offering services or goods for sale (teleshopping) can activate for the user that agent which is most likely to make a sale.

A version of the method in accordance with the invention is characterized in that the method comprises a step for deactivation by the user of the agent activated during the activation step. This enables the user to reject an agent proposed by the system in order to obtain a different agent.

A version of the method in accordance with the invention is characterized in that the image of the user affinity is formed on the basis of the user's cognizance of the specific information item. User cognizance of the specific information item is one of the possibilities of forming an image of the user affinity between the user and the information items. This information is used in a next stage for the selection of a next information item, so that the user is then confronted with an information item which better suits the user's needs.

A version of the method in accordance with the invention in which the set comprises sub-sets and in which one of the sub-sets is made accessible for selection of the specific information item by the first agent is characterized in that a sub-set comprises a first list with neighbor sets, a neighbor set comprising a given one of the other sub-sets, and that the first agent selects, as an alternative for the specific information item, a specific sub-set from the first list of the accessible sub-set. The structure in which a given sub-set is associated with a selection from the other sub-sets offers the user a degree of ordering of the information items which is attractive for the searching of the entire set of information items.

A version of the method in accordance with the invention is characterized in that the accessible sub-set with the sub-sets from the first list are reproduced spatially to the user. The spatial arrangement of the sub-sets in a virtual space offers the user an ordering which closely resembles the ordering of objects in reality. Such natural ordering simplifies the retrieval of information items by the user and also makes the initial use of the system less complicated.

A version of the method in accordance with the invention is characterized in that in addition to a first representation of the selected specific information item there is also reproduced a second representation of a non-selected information item. By additionally showing one or more information items other than the selected information item, the user is informed further as regards the presence of the information items in the set. This is useful in exploring a large set of information items.

The system in accordance with the invention is characterized in that it comprises means for forming an image of a user affinity between the user and the information items on the basis of a pattern of past interactions between the user and the system and for recording this image in a user attribute, and that the first agent is suitable to select the specific information item in further dependence on the user attribute. As a result of the recording of a degree of affinity of the user for given information items, the agent of the system can select the information item which best suits the user. The affinity is dynamically updated on the basis of the actions undertaken by the user of the system. This means that at a later instant an information item may be selected other than that which best suits the user until that instant.

Various attractive embodiments of the method and the system in accordance with the invention are described in the dependent Claims.

These and other aspects of the invention will be apparent from and elucidated with reference to the embodiments described hereinafter.

Figure 1:
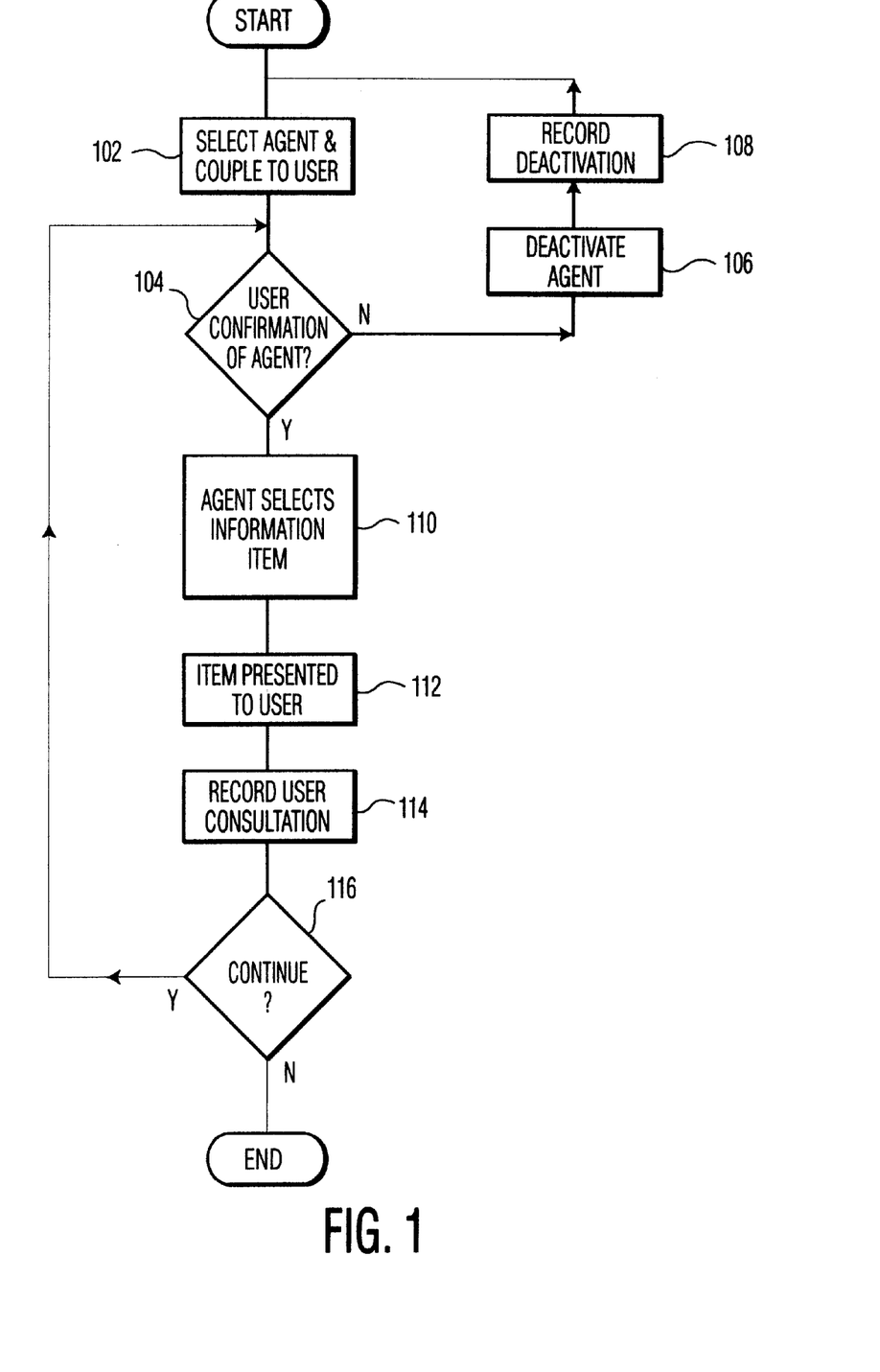
FIG. 1 shows a flow chart of a system in which the method of the invention is used.

FIG. 1 shows a flow chart of a system in which the method of the invention is used. The flow chart offers a general survey with the most important elements. A practical example of such a system concerns a database containing a multitude of information items, a user of the system being assisted in searching the database. The contents of the information items may be recorded in the database in various ways. A simple text, a graphic representation, a video film and an audio fragment are examples of feasible appearances of the information items. The user is assisted by a so-called agent in searching the database. According to the method of the invention, such an agent selects the item which, in conformity with given criteria, best suits the user at the relevant instant and the agent proposes this item to the user. At the level of interaction with the user such an agent can be realised in various ways. Simple, textual indications can be issued to the user on a display screen of the system, but alternatively there can be reproduced an audio-visual animation of a figure who behaves as a guide for the user. At the level of the implementation in the system the agent can be realised as a software module with a possibly very complex set of dependencies between input parameters and output parameters of the module. At a given instant such a module is in an instantaneous internal instantaneous internal state and can change over to one of the other feasible internal states under the influence of a number of input parameters. The value of the output parameters is determined by the value of the input parameters and the instantaneous internal state. A given form of consistent behaviour can be simulated by means of such a module: on the basis of observation of the environment, transferred to the module via the input parameters, an action is undertaken in the environment, via the output parameters and based on the state of the module. In a system in which the user is assisted in searching a database in the described manner, various agents may be available. An agent then selects information items from the database, inter alia on the basis of an apparent own preference which is implemented via the internal state of the relevant module.

Figure 2:
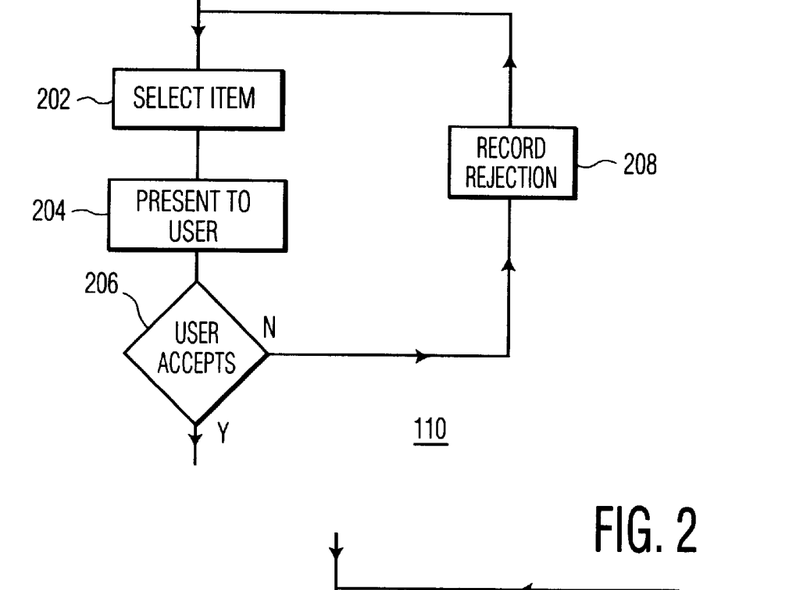
FIG. 2 shows the selection step of a version of the method in accordance with the invention.
Figure 3:
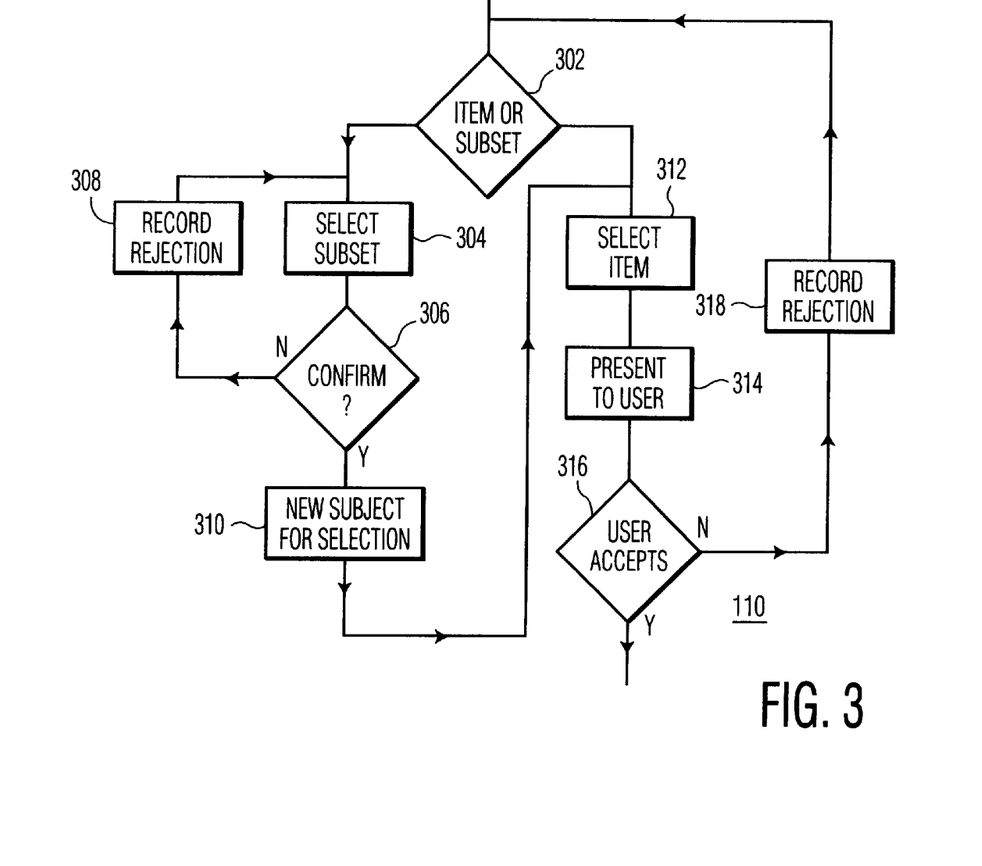
FIG. 3 shows an alternative for the selection step of a version of the invention.

In block 102 in FIG. 1 an agent of the system is selected and coupled to a user. The agent selected may be the same as during the previous user session. Selection, however, may also take place on the basis of a user attribute so as to find an optimum agent for the user. The user attribute records the apparent affinity of a user for the information items, established on the basis of previous interactions. The user attribute may contain a complex user history concerning previously selected information items, items rejected by the user, and the time spent on each type of item by the user. However, it may also contain more statistic data such as the user's age, gender and education and many other types of data. Furthermore, the step 102 could be executed as a selection made by the user from a list of available agents. In a system involving only one agent, the block 102 could even be completely omitted. Block 104 illustrates the possibility for the user to confirm a coupling between agent and user or not. The block 104 may be implemented as an explicit user confirmation of a coupling proposed by the system. However, it may also be implemented as a user option, continuously present during the course of events in the system, to decouple an agent. Block 106 implies the deactivation of the agent and in block 108 the fact that the user has performed such an action is recorded in the user attribute, so that this fact can be taken into account for a next selection of an agent. In block 110 the agent selects an information item on the basis of the instantaneous state of the agent and on the basis of the user attribute. The user attribute contains information wherefrom the agent deduces which next information item best suits the user at the relevant instant. The user attribute contains, for example a score of the type of information items consulted earlier by the user, but it may also contain further information as regards the interaction between the user and the system. FIGS. 2 and 3 show two more detailed implementations of the block 110.

In block 112 of FIG. 1 the information item is presented to the user. The type of presentation is dependent on the nature of the contents of the information item. Presentation may involve the display of a document on the display screen, but also the reproduction of an audio fragment or the showing of a video film. The block 112 can be terminated in two ways. The user can decide to have heard and/or seen enough after some time. Furthermore, the end of the information may be reached, for example the end of a music or video fragment constituting the contents of the relevant information item. Tie characteristics of the actual consultation of the information item by the user are recorded in the user attribute in block 114, so that this information can be used for the selection process for the next information item. As has already been described, in addition to these data concerning the consultation, the user attribute may contain a multitude of other data concerning the user. Finally, in block 116 it is checked whether a next information item is to be selected or whether the session is to be terminated. In block 116 this can be implemented in the form of an explicit question for the user, but it can also be a user option for terminating the session with the system at any time.

In addition to the user attribute, the agent is also updated on the basis of the use of the system. On the basis of user interactions an agent may also decide that it no longer suits this user. Furthermore, at a given instant another agent may decide that it better suits the user and present itself to the user. These possibilities for an agent have been omitted from FIG. 1 for the sake of clarity.

According to the described method of the invention, an information item is proposed to the user in a given way. To this end, an information item not only has said item attributes and item contents, but also a given appearance. In case the information item relates to a given visual representation, for example a painting or a photograph, the contents of the item or a representation derived from the contents can be used as the appearance for showing the item to the user. In other cases an appearance will be selected which consists of a more general representation provided with an identification. For example, when the information item concerns a book, the appearance may be a general symbol for a book, provided with the title of the relevant book. Various other possibilities also exist for utilizing an appearance of an information item for the user.

A system carrying out the method of the invention as shown in FIG. 1 can offer the user, in addition to the selection possibility by means of an agent, a selection possibility whereby the user selects the specific item fully independently. To this end, the information items can be shown to the user in a given, for example hierarchic manner, after which the user selects the specific information item. Such direct selection is to be used notably when the user already knows that a given information item is present and wishes to consult this item. Information as regards the independent selection and consultation of information items by the user can be recorded in the user attribute, so that an agent can use this information for a later selection step.

FIG. 2 shows the selection step of a version of the method of the invention and constitutes a detailed representation of the block 110 of FIG. 1. In block 202 of FIG. 2 the agent selects an information item from the entire database or from a given sub-set of information items. Such a sub-set may be formed on the basis of items which are logically arranged near one another for the sake of presentation to the user. For example, a set of information items may concern paintings which are presented to the user as a gallery with paintings in a museum. Another subdivision into sub-sets consists in association of a given agent with a given sub-set of information items from the database. Various, overlapping sub-divisions into sub-sets in the system can be made. Upon selection of the information item, two types of criteria are used. First of all, the information item should suit the relevant agent, said instantaneous internal state being used to record a degree of affinity between the information items and the agent. This type of criterion can be implemented as a simple table for the agent, weighting factors being included for the various types of attributes of the information items. For each relevant information item a score is then determined on the basis of the table and the value of the attributes of the information item. Secondly, the information item should suit the user. To this end, in addition to the attributes of the information item, the parameters constituting said user attribute are applied to the agent as input parameters so as to be involved in the selection process. As a result of the use of the two types of criteria, successively selected information items on the one hand result in interesting subjects for the user and on the other hand form a consistent image of the agent for the user. It is known that such a consistent image offers a substantial assistance to the user in searching a database comprising a multitude of information items.

After the selection by the agent, the information item is presented to the user as a possibly interesting information item in block 204. This presentation may be realised in various ways. It may be a simple textual message on the display screen of the user, but it may also be the pointing out of an object in a staged space by a staged person. An example of the latter is the pointing out of a painting, in a simulation by the system, by a guide in a museum gallery. In block 206 the user can actually consult or reject the proposed information item. Block 206 can be implemented in various ways, for example as an explicit confirmation by the user but also as a possibility for rejection in case the actual display or reproduction of the information item has already started. If the user rejects the information item, the rejection is recorded in the user attribute in block 208 and subsequently another information item is selected by the agent.

FIG. 3 shows an alternative for the selection step of a version in accordance with the invention. Therein, the set of information items contains a number of sub-sets in which the information items are included. At a given instant a given sub-set is accessible and the agent selects the item for the user from this accessible sub-set. A sub-set also contains a list of references to other sub-sets with which this sub-set is associated for some reason. An example in this respect is a sub-set with information items for the user which is reproduced as a room in a building with objects to be consulted, the room including a list of references to adjoining rooms in the same building. This representation can be organised in a hierarchic way, the sub-set "building" then including a list with references to other buildings in the vicinity. In block 302 it is determined whether the agent will select a next information item or whether another sub-set will be proposed. This decision is made, like the selection of an information item, on the basis of the agent and on the basis of the user. For example, when a user has consulted all sub-set items of interest to him, an agent will conclude that a next sub-set will have to be proposed. In terms of the previous example involving paintings, the guide will suggest the user to proceed to a next gallery of the museum if it has the idea that all interesting paintings in the present gallery have been observed. In block 304 the agent selects, inter alia on the basis of the user attribute, a sub-set from the list of the instantaneously accessible sub-set and proposes this new sub-set to the user. In block 306 the user can confirm this proposal and a rejection, if any, is recorded in the user attribute in block 308, so that this rejection can be taken into account for a next proposal. The block 306 can be implemented in various ways, for example as an explicit confirmation of the proposal by the user but also as a continuously present possibility for rejection of the relevant sub-set. After confirmation, in block 310 the new sub-set is made accessible for selection by the agent. The selection of the information item from the newly accessible sub-set takes place in blocks 312 to 318 in the same way as in the previously described blocks 202 to 208.

A sub-set with information items may contain more than one list of references to other sub-sets. The first list then provides references to sub-sets associated with the relevant sub-set for a first reason, and the second list provides references to sub-sets associated with the relevant sub-set for a second reason. An example in this respect is a sub-set which is reproduced as a library of books. The library comprises a first list with buildings to be visited in the vicinity of the library and a second list of libraries which are situated elsewhere in the city and require a given form of transport so as to be reached. One reason of association is: "to be seen in the direct vicinity" and the other reason of association is: "other libraries in the city". These different associations can be presented to the user as different ways of making the agent propose the various sub-sets. Furthermore, making various types of sub-sets accessible can be presented to the user in various ways. For example, as a "walk" to the building in the vicinity and as a "bus trip" to the library situated further away.

The presentation of sub-sets and their relationship can be implemented in many ways. A sub-set may be represented in a virtual space, for example a bookcase with information items in the form of books, a second sub-set in the same space then being assigned a location relative to the first sub-set, for example a second bookcase in another part of the room. When sub-sets are presented as buildings to be visited, their relationship can be shown in the form of a map of a virtual city in which the buildings are present. A user is familiar with the spatial arrangement of objects by nature and it is known that the accessibility and the ease of use of a system are substantially enhanced by a spatial presentation of information items.

A system with spatial presentation of the sub-sets and the information items may involve a type of voyage from one set or information item to the other. During such travel the system can show adjoining sets and information items, so that a user can become acquainted with other information items in the database. For an implementation of travelling use can be made of the fact that each sub-set corresponds to an object in the spatial representation which occupies a given position in said space. When a next sub-set is made accessible for selection, a voyage is then made along a route from a position corresponding to the present sub-set to a position corresponding to the next sub-set. The system checks which other sub-sets are situated near this route and shows these sub-sets during the voyage.

Figure 4:
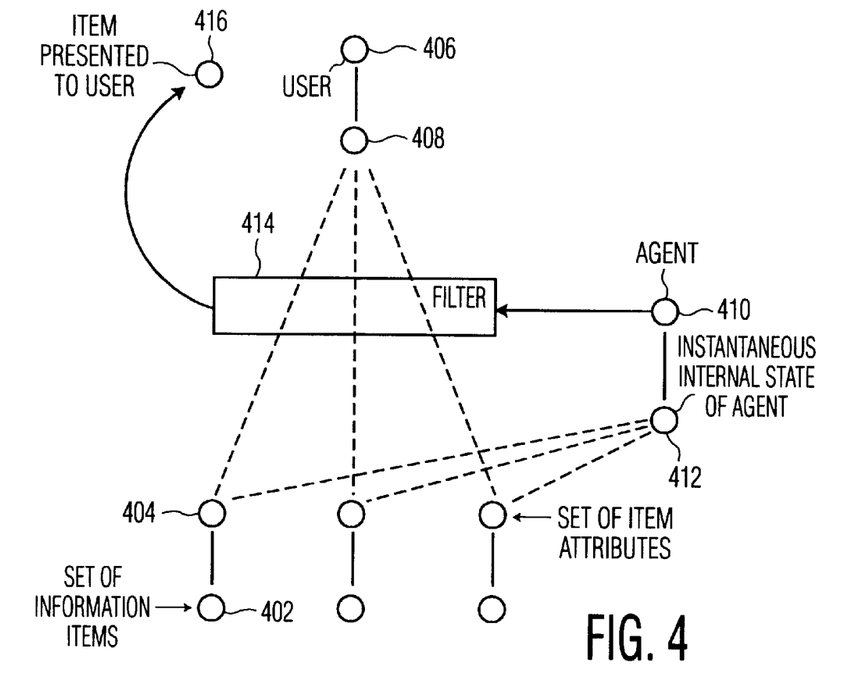
FIG. 4 shows the relationship between information items, an agent and a user.

FIG. 4 shows the relationship between information items, an agent and a user in an embodiment of the system of the invention. The system contains a set of information items 402, each of which comprises a respective set 404 of item attributes. A set of item attributes constitutes a characterization of the information item and serves for the selection process of the information item. For the user 406 of the system the system also comprises a user attribute 408. This user attribute records an affinity between the user and the information items. The user attribute is not a constant parameter but is derived by the system inter alia from the interactions between the user and the system. Finally, the system includes an agent 410 which is in an instantaneous internal state 412 defining an affinity between the agent and the information items. The selection of the specific information item can be considered as the operation of a filter 414 which is controlled by the agent 410. On the basis of the user attribute and the sets 404 of item attributes, the specific information item 416 is filtered from the set of information items 402 for presentation to the user.

Figure 5:
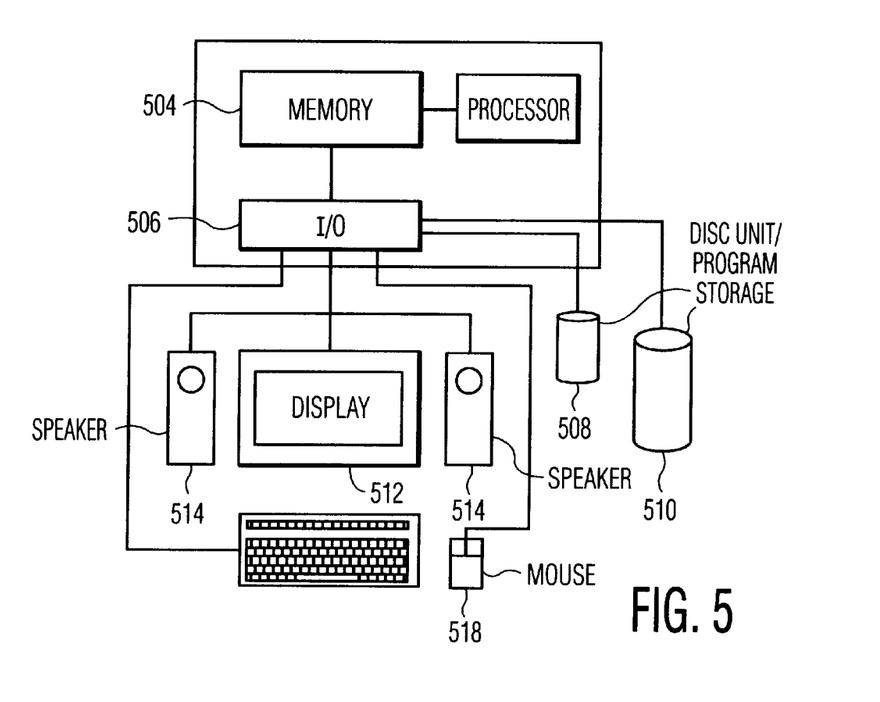
FIG. 5 shows an embodiment of the system of the invention.

FIG. 5 shows an embodiment of the system in accordance with the invention. It concerns a general purpose computer provided with the necessary hardware and loaded with a program capable of executing the method of the invention. The system comprises a processor 502 for executing the program which is loaded into a working memory 504 for this purpose. A system of this kind usually comprises a section 506 for handling input and output. The system comprises a disc unit 508 which contains the program to be loaded into the memory. It may be a magnetic disc unit or an optical disc unit, the discs being exchangeable or not. The program could also be loaded in a manner other than from a disc, for example via a data communication link to another computer. Furthermore, the system comprises a disc unit 510 containing the set of information items. This may also be a magnetic or optical disc unit with discs which are exchangeable or not. The disc units 508 and 510 may be combined so as to form a single disc unit. The disc unit 510 may alternatively consist of a number of disc units if so necessitated by the amount of data concerning the information items. The set of information items may also be present in a different location under the control of a central computer, in which case the information items must be fetched via a data communication link instead of from a disc unit. The system comprises a display screen 512 and loudspeakers 514 for reproducing the contents of the information items to the user. If exclusively visual information items are concerned, the loudspeakers 514 can be dispensed with. In order to enable data to be entered by the user, the system comprises a keyboard 516 and a pointer means 518, for example a mouse. Depending on the execution of the method in accordance with the invention, the keyboard or the mouse can be dispensed with or even, on the contrary, be supplemented by another input means.

The embodiments of the system in which the invention is used are not restricted to one user. The system in accordance with the invention can be arranged for use by various users which apparently are simultaneously served by the system in a manner which is known from conventional database systems and which will not be described herein for the sake of brevity. In an embodiment of the system of the invention in which various users are simultaneously active, these users can interact with one another. This can be implemented in the form of textual questions and answers from the various users, but also in the form of a meeting of staged persons, representing the various users, in a staged space.

Some simple examples of a few concepts used in the described system are given hereinafter. Examples of information items are:

| | | |
|---|---|---|
| item1: | | |
| | item number: | 1 |
| | material: | 'wood' |
| | maker: | 'Janssen' |
| | vintage: | '20$^{th}$ century' |
| | type: | 'table' |
| | contents: | graphic representation of the relevant table |
| item2: | | |
| | item number | 2 |
| | material | 'synthetic' |
| | maker: | 'Janssen' |
| | vintage: | '20$^{th}$ century' |
| | type: | 'chair' |
| | contents: | photograph of the relevant chair |
| item3: | | |
| | item number: | 3 |
| | material: | 'intangible' |
| | maker: | 'unknown' |
| | vintage: | '17$^{th}$ century' |
| | type: | 'opera' |
| | contents: | audio file of the opera |

An information item has item attributes which have a given value for the relevant item. Furthermore, an information item has a given contents which can be consulted by the user of the system. The item attributes of item1 are: material, maker, vintage and type. The item attributes have the values: 'wood', 'Janssen', '20$^{th}$ century' and 'table', respectively.

An example of an agent where the internal state involves simple weighting factors for the various item attributes is:

| | | |
|---|---|---|
| agent1: | | |
| | internal state: | |
| | state: | free |
| | material: | 10 |
| | maker: | 4 |
| | vintage: | 2 |
| | type: | 10 |
| | An example of the user attribute is: | |
| user1: | | |
| | material_wood: | 10 |
| | material_iron: | 1 |
| | material_intangible: | 5 |
| | maker_Jansen: | 8 |
| | maker_Pietersen: | 6 |
| | maker_unknown: | 9 |
| | vintage_middle ages: | 10 |
| | vintage_20$^{th}$_century: | 0 |
| | . . . | |
| | type_table: | 0 |
| | . . . | |
| | . . . | |
| | last_seen_item_material: | iron |
| | . . . | |
| | . . . | |

-continued

| | |
|---|---|
| age: | 24 |
| ... | |
| ... | |

For evaluation of the information items per information item a score is determined on the basis of the above attributes of the items, the agent and the user. This determination can be realised by way of a more or less complex evaluation function which utilizes the values of the various attributes as variables. One possibility is to multiply the value of each of the corresponding attributes by one another and to sum the products thus found so as to form a score per information item. Per item there can thus be calculated a position or score which are subsequently compared with one another upon selection in order to arrive at the best choice. For a position it holds that:

position=$(p_1, \ldots, p_n)$, in which n is the number of item attributes.

The value of $p_i$, where $1 \leq i \leq n$, is determined in conformity with:

$p_i$=value (user attribute associated with the value of the $i^{th}$ attribute)×value(agent attribute associated with the value of the $i^{th}$ attribute).

When applied to item1 and user1 this produces:

position=(10×10, 8×4, 0×2, 0×10)=(100, 32, 0, 0)

There are a large number of alternatives for such an evaluation function determining a position on the basis of item attributes and the user attributes. Instead of being multiplied, the relevant items could be summed or maximized.

On the basis of the calculated position of the items, subsequently the most suitable must be determined. An item p having a position $(p_1, \ldots, p_n)$ must then be compared with an item q having a position $(q_1, \ldots, q_n)$. This can be performed, for example by summing the elements of the position; in that case $(p_1, \ldots, p_n) > (q_1, \ldots, q_n)$ if $p_1 + \ldots + p_n > q_1 + \ldots + q_n$ The comparison can also be performed by more complex weighting of the elements of the position, for example:

$(p_1, \ldots, p_n) > (q_1, \ldots, q_n)$ if $\sqrt[n]{p_1^n + \ldots + p_n^n} > \sqrt[n]{q_1^n + \ldots + q_n^n}$ The following is an example indicating how the time spent by a user in consulting information items can be used for the selection of a next information item. The system comprises the previously described items and agent and the following user attribute:

user:

| | |
|---|---|
| rejected: | { 1, 34, 56 } |
| seen: | { 33, 101, 34, 54, 104, 12, 2 } |
| preference1: | { 3, 54 } |
| preference2: | { 5, 33, 101 } |
| preference3: | { } |
| preference4: | { 2, 103 } |
| preference5: | { 12, 104 } |
| last_item: | 2 |

Therein, the attribute "rejected" indicates which items have been rejected by the user. The attribute "seen" constitutes a list of items seen by the user. This list has a fixed length; the length in the present example is 7, the most recent item being added at the end and, if necessary, the first item of the list being deleted. The attribute "seen" can be initialized per session or can be saved through several sessions. The attributes "preference1" to "preference5"indicate how long the user has consulted an item. For example, an item in "preference 1" shorter than 30 seconds; in "preference2" 30–60 seconds, in "preference3" 1–4 minutes, in "preference4" 4–5 minutes and in "preference5" more than 5 minutes. Finally, the attribute "last_item" contains the item last consulted by the user.

The selection of an information item by an agent is a given probabilistic algorithm. Upon selection the agent determines, for each relevant information item, for example each information item in the currently accessible sub-set, a number on the basis of the user attribute as it is composed from the various attributes as described above. The items are then weighted in dependence on their occurrence in said attributes. For example, a first number is assigned as follows to each relevant information item:

to items in "seen": 0
to items in "rejected": 0.01

Furthermore, the first number is assigned as follows to information items whose attribute value corresponds to an information item in one of the preference attributes:

| | |
|---|---|
| corresponding to an item in "preference1": | 1 |
| corresponding to an item in "preference2": | 3 |
| corresponding to an item in "preference3": | 4 |
| corresponding to an item in "preference4": | 10 |
| corresponding to an item in "preference5": | 20 |

Finally, the value 15 is assigned as the first number to all other information items.

Furthermore, a second number which represents the preference of the agent on the basis of its instantaneous internal state is assigned to each relevant information item. Furthermore, the last item seen is taken into account so as to obtain a given stability as regards the type of successively selected information items. This second number is calculated by taking the sum of all item attributes of the product of the value of the corresponding agent attribute and the correspondence between the value of the attribute for the last information item seen and the item for which the second number is determined. A simple manner of representing numerically the correspondence between the value of the attribute of the last information item seen and the item for which the second number is determined is to assume this correspondence to be 0 if the values differ and 1 if the values correspond. If the value of the second number is thus determined for item1 there is obtained:

(10×0+4×1+2×1+10×0)=6.

Ultimately, per information item a total value is calculated on the basis of the first number and the second number per information item. This can be done by adding the first number and the second number per information item. Alternatively, the first number and the second number per information item can be multiplied one by the other. The chance that an agent will present a given information item equals the total value of the information item determined, divided by the sum of the total values for all relevant information items.

What is claimed is:

1. A method enabling a user to fetch a specific information item from a set of information items in an information processing system in which each information item has one or more item attributes, the system comprising a first agent for evaluating the item attributes associated with the information items, thus forming an agent affinity between the first agent and each of the information items evaluated, the method comprising:

selecting the specific information item by the first agent in dependence on said agent affinity; and forming at least once an image of a user affinity between the user and the information items from a pattern of past interactions between the user and the system and recording this image in a user attribute;

wherein the selection step comprises the selection of the specific information item by the first agent in further dependence on the user attribute.

2. A method as claimed in claim 1, wherein the set comprises sub-sets; and further comprising executing the following operation in the processor: making one of the sub-sets accessible for selection of the specific information item by the first agent, the one sub-set comprising a first list with neighbour sets, a neighbour set comprising a given one of the other sub-sets, and wherein, in the causing step, the first agent selects a specific sub-set from the first list of the accessible sub-set, which specific sub-set includes the at least one specific information item.

3. A method as claimed in claim 2, wherein:

the making accessible of a subset on the basis of the first list is presented to the user in a first way; and a sub-set comprises a second list of neighbour sets, the making accessible of a sub-set on the basis of the second list being presented to the user in a second way.

4. A method as claimed in claim 2, wherein the accessible sub-set with the sub-sets from the first list are reproduced spatially to the user.

5. A method as claimed in claim 4, wherein the spatial reproduction comprises a reproduction of the sub-sets on a map.

6. A method as claimed in claim 4, wherein the spatial reproduction comprises a reproduction of the sub-sets in an artificial space.

7. A method as claimed in claim 2, wherein the information items have an appearance which can be reproduced on a display screen of the system and the appearance of the information items of the accessible sub-set is displayed.

8. A method as claimed in claim 2, further comprising executing the following steps in the device:

providing a first representation of the one sub-set to the user; and providing a second representation of a non-accessible sub-set to the user.

9. A computer method for selecting at least one specific information item from amongst a set of information items, each item having one or more attributes, the method comprising executing the following steps in a digital data processing device:

maintaining a first agent profile;

maintaining a user profile based upon a pattern of past interactions between the user and the system; and causing the first agent to select the specific information item based upon a first relationship between the first agent profile and the attributes of the items in the set; and a second relationship between the user profile and the attributes of the items in the set.

10. The method of claim 9 further comprising executing the following steps in the device:

maintaining respective profiles for a plurality of agents; and activating the first agent from amongst the plurality based upon the user profile.

11. The method of claim 10 further comprising executing the following step in the device: deactivating the first agent in response to user input.

12. The method of claim 9 further comprising the step of updating the user profile based upon user acceptance or rejection of the specific information item.

13. A method as claimed in claim 9, further comprising executing the following steps in the device:

presenting a first representation of the specific information item to the user, and presenting a second representation of a non-selected information item to the user.

14. An information processing system comprising:

a set of information items, each of which comprises one or more item attributes;

a first agent having an instantaneous state for evaluating the item attributes associated with the information items and determining an agent affinity between the first agent and the information items, and for selecting a specific information item from the set for a user of a system in dependence on the agent affinity; and means for forming an image of a user affinity between the user and the information items on the basis of a pattern of past interactions between the user and the system and for recording this image in a user attribute;

wherein the first agent is suitable to select the specific information item in further dependence on the user attribute.

15. An information processing system as claimed in claim 12, wherein the set comprises sub-sets, at least one of the sub-sets comprising a first list with neighbour sets, and the causing operation includes causing the first agent to select a specific sub-set from the first list of the accessible sub-set which specific sub-set includes the at least one specific information item.

16. An information processing system as claimed in claim 15, wherein the sub-set comprises a second list of neighbor sets;

the processor is further configured for performing the following operations:

presenting to the user the making accessible of a first sub-set to the user in a first way, on the basis of the first list presenting to the user the making accessible of a second sub-set in a second way, on the basis of the second list.

17. An information processing system as claimed in claim 15, wherein the first way is spatially.

18. A digital data processing device for selecting at least one specific information item, the device comprising:

at least one medium readable by the device, the at least one medium embodying:

a set of information items, each of which comprises one or more item attributes;

an instantaneous state of at least a first agent; and a user profile;

at least one processor configured for performing the following operation:
  causing the first agent to select the specific information item from the set based upon
    a first relationship between the instantaneous state and the attributes of the items in the set; and
    a second relationship between the user profile and the attributes of the items in the set.

19. The device of claim 18, wherein the process is configured to perform the following additional operations;
  providing a first representation of the specific information item; and
  providing a second representation of a non-selected information item.

20. The device of claim 18 wherein:
  the at least one medium embodies instantaneous states of a set of agents, which set of agents comprises the first agent; and
  the processor is further configured to perform the following operation:
    causing activation of the first agent in dependence on the user attribute.

21. The device of claim 18, wherein said at least one processor is further configured to update the user profile based upon user acceptance or rejection of the specific information item.

* * * * *